United States Patent [19]

Toepfer et al.

[11] Patent Number: 5,369,352
[45] Date of Patent: Nov. 29, 1994

[54] UNIVERSAL ELECTRIC VEHICLE CHARGING ADAPTER

[75] Inventors: Craig B. Toepfer, Dearborn; Robert K. Brown, Plymouth, both of Mich.

[73] Assignee: Ford Motor Company, Dearborn, Mich.

[21] Appl. No.: 51,959

[22] Filed: Apr. 26, 1993

[51] Int. Cl.$^5$ .............................. H02J 7/00
[52] U.S. Cl. .......................... 320/56; 320/2; 363/143
[58] Field of Search ............ 320/2, 9, 10, 22, 23, 320/24, 27, 56, 57; 363/142, 143

[56] References Cited

U.S. PATENT DOCUMENTS

| | | | |
|---|---|---|---|
| 2,420,609 | 5/1947 | Mitchell | 320/56 |
| 3,270,267 | 8/1966 | Nolte, Jr. | 320/56 |
| 3,409,816 | 11/1968 | Foster | 320/57 |
| 3,939,362 | 2/1976 | Grimes et al. | 363/143 |
| 4,232,260 | 11/1980 | Lambkin | 320/2 |
| 4,234,839 | 11/1980 | King et al. | 320/2 X |
| 4,258,304 | 3/1981 | Bourke | 320/2 |
| 4,309,644 | 1/1982 | Reimers et al. | 320/2 X |
| 5,162,721 | 11/1992 | Sato | 320/2 X |
| 5,191,499 | 3/1993 | Gaus et al. | 361/49 |

FOREIGN PATENT DOCUMENTS 1206845 8/1989 Japan ....................... 320/2

OTHER PUBLICATIONS

King et al., "Power Supplies for Electronic Equipment", IBM Technical Disclosure, Jan. 1985, pp. 4730–4731.

"Automatic Input-Selecting Power Supply", IBM Technical Disclosure, Aug. 1985, pp. 1246–1247.

"Automatic Selection of Line Voltage Top for a Power Supply", IBM Technical Disclosure Bulletin, Mar. 1986, pp. 4372–4373.

*Primary Examiner*—Kristine L. Peckman
*Attorney, Agent, or Firm*—Mark L. Mollon; Roger L. May; Kevin G. Mierzwa

[57] ABSTRACT

An adapter for an electric vehicle is provided which imposes an identification signal on the outlet voltage to inform the battery charger of the characteristics of the outlet (e.g., the maximum current and voltage) to allow the battery charger to charge at the maximum possible rate allowable by the outlet.

4 Claims, 2 Drawing Sheets

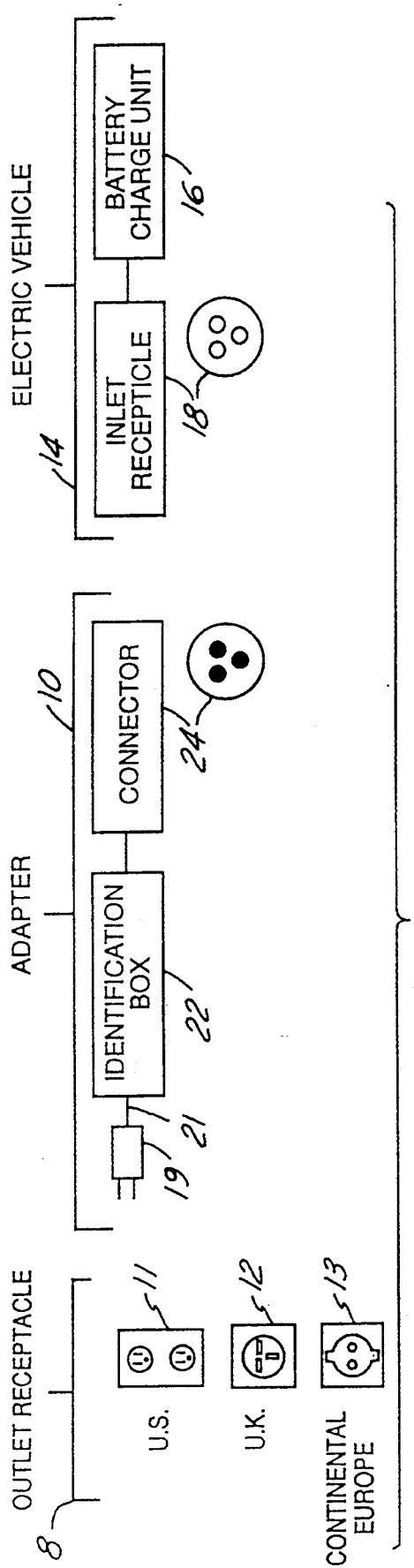
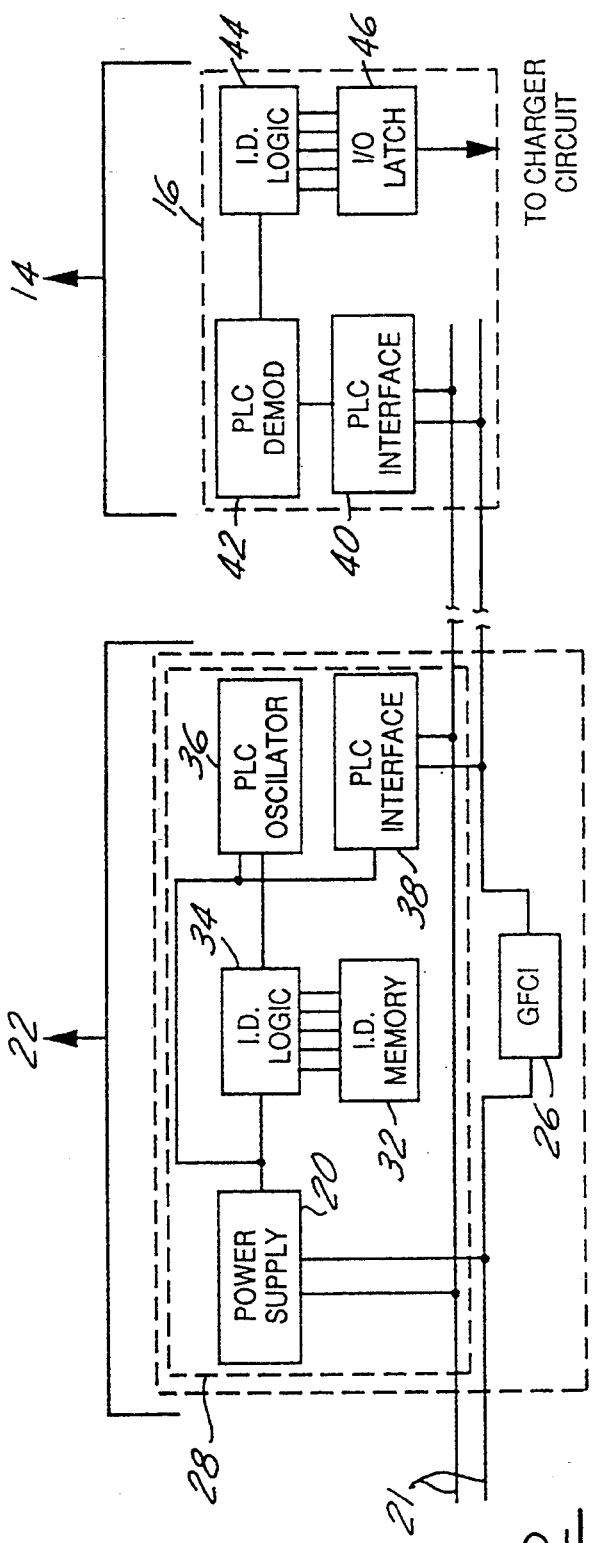

UNIVERSAL ELECTRIC VEHICLE CHARGING ADAPTER

BACKGROUND OF THE INVENTION

The invention relates generally to electric vehicle power systems and more specifically to an adapter for connecting an on-vehicle battery charger with an electrical outlet wherein the adapter transmits certain electrical characteristics of the outlet to the charger.

Electric vehicle battery systems typically employ charging facilities with unique features and greater power transfer capabilities than most conventional electrical outlets. Therefore, specially adapted recharging stations are provided with power supply capability coincident with the recharge capability of the electric vehicle power system. Nevertheless, it is desirable to have the capability to recharge electric vehicles using either specially adapted charging facilities or standard wall outlets if such a charging facility is unavailable. The specially adapted charging facilities may deliver current at a rate of about 230 volts and 30 amps while a standard wall outlet delivers 120 volts and 12 amps.

It is desirable to produce an electric vehicle power system capable of being recharged anywhere in the world. One obstacle, however, lies in the different electrical services provided throughout the world. For example, the line voltage in the U.S. is 120 volts while in Europe it is 230 volts. Household-type appliances are known which transform the different outlet voltages to a common voltage to operate the appliance. However, in this method the power transfer capabilities of the outlets are not fully utilized. A special outlet is capable of handling a significantly higher current than a standard wall outlet and thus, a battery can be charged at a faster rate. If a battery charger attempts to charge through a standard wall outlet at the high current of a special outlet, current in excess of the ratings for the outlet and household wiring will flow thereby tripping a circuit breaker or blowing a fuse.

It is therefore desirable to provide an adapter that informs the battery charger of the electrical characteristics of the outlet, thereby allowing the charger to fully utilize the power capabilities of the outlet.

SUMMARY OF THE INVENTION

An object of the present invention is to allow a vehicle charger to maximize its charge rate based on the capabilities of the power supply.

Briefly, a preferred embodiment of the present invention includes a connection means for electrically connecting a battery charger to a specific electrical outlet having known electrical characteristics. The electrical characteristics are stored in a memory in the adapter. A generator means generates an identifier signal representative of the electrical characteristics. A transmitting means transmits the identification signal via the connection means to the battery charger. The identification signal uniquely identifies such characteristics as the voltage rating, current rating and other critical information of the outlet. The adapter may also include a ground fault circuit which opens the circuit upon detection of a short between power and ground.

One advantage of this invention is that a common battery charger can be used on vehicles throughout the world. A different adapter coded with different information is all that is needed to connect to different power supplies.

Another advantage of the invention is that it allows redesign of charging facilities in the future along with the modification of the adapter without having to modify the battery charger.

Another advantage of the invention is that by fully utilizing the power capability of the outlet to which the charger is connected, the time to recharge a battery is minimized.

BRIEF DESCRIPTION OF THE DRAWINGS

FIG. 1 is a plan view of the recharging system of the invention.

FIG. 2 is a block diagram of the circuitry of the identification circuit of FIG. 1.

PREFERRED EMBODIMENT OF THE INVENTION

Figure 3:
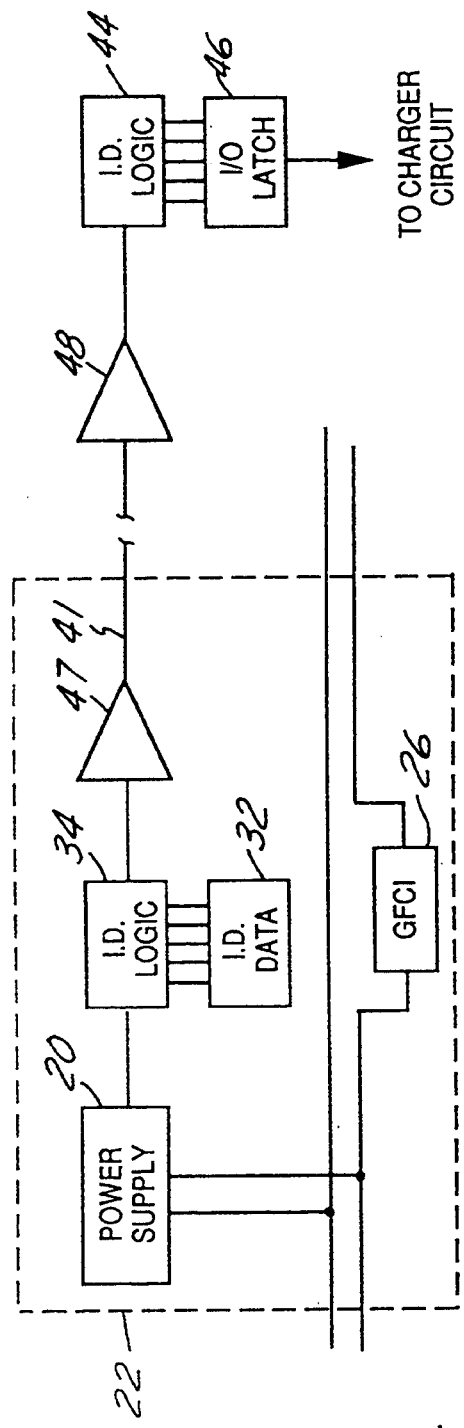
FIG. 3 is an alternative embodiment of the adapter identification circuitry.

Referring now to FIG. 1, an adapter 10 provides a link between an outlet receptacle 8 and an electric vehicle 14. Adapter 10 is comprised of a plug 19, power line 21, an identification box 22 and a connector 24. Battery charge unit 16 and inlet receptacle 18 are preferably common to all vehicles 14. Due to the different variations of shape and capacity of outlet receptacles 8 throughout the world, a corresponding adapter 10 having a unique plug 19 is provided for each respective outlet receptacle 8. For example, in the U.S. and Canada the standard NEMA 5-15P plug 11 for an outlet rated at 120 volts and 12 amps would be provided. In addition, an adapter having a unique plug for various charging stations would also be provided. The United Kingdom and Continental Europe have plugs for outlets with standard 230 volts and 30 amp capabilities having slightly different geometries which use the BS 1363 and CE 7/7 standards as represented by 12 and 13, respectively. Thus, different adapters with unique plugs 19 are provided for recharging from each of the various types of outlets.

Battery charger 16 is capable of adjusting the charge rate by varying the amount of current drawn from outlet receptacle 8 in response to the information received from powerline identification box 22. For example an adjustable current regulator may be used.

Referring now to FIG. 2, adapter 10 has an identification box 22 which comprises a ground fault interrupt circuit 26 and an identification circuit 28 electrically connected to power line 21. Power line 21 is connected in series with ground fault interrupt circuit 26 which is of the type providing short-circuit protection by opening the circuit upon detection of a short circuit between the power line and ground. For example, a ground fault interrupt circuit for a standard U.S. 120 volt outlet is manufactured by Hubbell Inc. of Bridgeport, CT, model GFP6C15. Other such ground fault circuits are available for other electrical standards.

Figure 4:
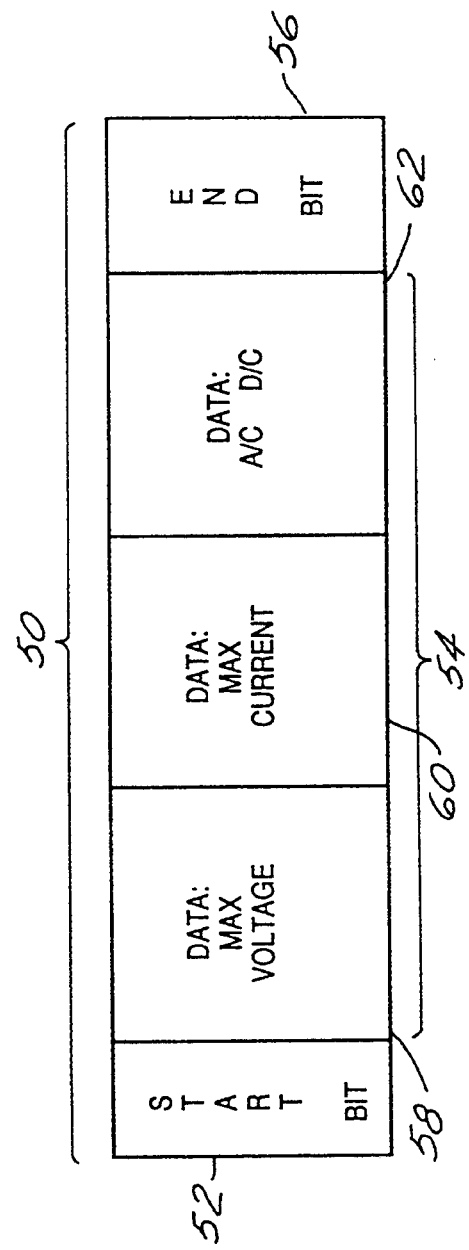
FIG. 4 is a configuration for the identifier code word.

Identification circuit 28 which is connected in parallel with power line 21 is powered by a power supply 20 which converts the power line voltage provided by power lines 21 to a predetermined D.C. voltage. As represented in FIG. 4, an identifier uniquely identifying the electrical capabilities of outlet receptacle 8 (e.g., voltage level, current level, and whether its alternating or direct current) is stored in an identifier code memory 32, preferably a non-volatile memory such as ROM. The codes contained in the memory 32 identify the maximum ratings of outlet to which adapter 10 is connected. Logic 34 reads the memory sequentially and converts the data to a series of pulses. A powerline carrier oscillator circuitry 36 converts the serial data into a amplitude modulated waveform which is then added to the powerline through a powerline interface 38. The waveform can be amplitude or frequency modulated, for example, as is known in the art.

The power line voltage with the added data signal leaves adapter 10 and is received into electric vehicle 14. Powerline interface 40 in on-vehicle charger 16 is connected to power line 21 and is preferably comprised of a bandpass filter for isolating the modulated code data. A demodulator 42 connected to interface 40 receives the code data and converts it to serial data (i.e., digital code). An identification logic circuit 44 acting as a demultiplexer is connected to demodulator 42 and converts the serial data to parallel data. Identification logic 44 is connected to I/O latch 46 which provides the data as required to the charger circuit (not shown). The information is used to determine the rate at which the charger draws current from the outlet receptacle 8.

In an alternative embodiment of FIG. 3, a transmitter 47 is used to transmit identification data via a transmission line 41 to a receiver 48 in charger 16. Transmitter 47, for example, comprises a light emitting device to convert the serial data to light pulses for transmission on a fiber optic cable. Receiver 48 reconverts the light pulses to serial data which is coupled to identification logic 44 for generating the identifier code.

FIG. 4 represents the identifier code 50 which is comprised of a start bit 52 followed by a series of data 54 and end bit 56. Data 54 represent the electrical characteristics of the outlet to which the adapter is capable of being connected. For example, data 54 can be comprised of the voltage rating 58, current rating 60 and whether the signal is alternating or direct current as shown in 62. The protocol can, for example, follow the Society of Automotive Engineer's Standard SAE J1850.

In operation, when battery recharging is needed, the vehicle is connected into an electrical outlet. A separate adapter is provided for every outlet to which the plug is likely to be connected. When identification circuit is energized the electrical characteristics of the outlet are transmitted to the recharger. The battery charger receives the data and determines the maximum rate at which it can charge.

What is claimed is:

1. A power line adapter for connecting an electrical outlet to an electrical input of an electric vehicle battery charger comprising:
   a connection means for electrically connecting said battery charger to said electrical outlet and adapted to be connected only to a specific electrical outlet with known electrical characteristics;
   storing means for storing said electrical characteristics; and
   imposing means for imposing an identifier signal upon the line voltage of said power source representative of said electrical characteristics;
   wherein said imposing means includes, serial means for converting the stored characteristics to a serial communication signal;
   modulating means coupled to said serial means for modulating a carrier signal according to said serial signal to produce a modulated signal;
   transmitting means coupled to said modulating means for transmitting said modulated signal to said battery charger.

2. An adapter as in claim 1 wherein said modulating means modulates the amplitude of said carrier signal, 3. An adapter as in claim 1 wherein said modulating means modulates the frequency of said carrier signal.

4. An electric vehicle battery recharging system for connecting to an electrical outlet comprising:
   a variable rate battery charger;
   a connection means having a specific configuration for electrically connecting said battery charger to a corresponding specific electrical outlet with known electrical characteristics including a line voltage;
   storing means for storing said electrical characteristics;
   adding means for adding an identifier signal upon said line voltage representative of said electrical characteristics;
   filter means for isolating said identifier signal from said line voltage;
   demodulation means coupled to said filter means for demodulating said identifier signal;
   demultiplexing means coupled to said demodulation means for converting said identifier signal into the electrical characteristics of said outlet; and
   latch means coupled to said demultiplexing means for controlling said battery charger.

* * * * *